(12) United States Patent
Sabia et al.

(10) Patent No.: US 8,062,732 B2
(45) Date of Patent: *Nov. 22, 2011

(54) GLASS ARTICLE HAVING IMPROVED EDGE

(75) Inventors: Robert Sabia, Corning, NY (US);
Jiangwei Feng, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 991 days.

This patent is subject to a terminal disclaimer.

(21) Appl. No.: 11/805,077

(22) Filed: May 22, 2007

(65) Prior Publication Data

US 2008/0292844 A1      Nov. 27, 2008

(51) Int. Cl.
*G02B 3/02* (2006.01)
(52) U.S. Cl. .............. 428/149; 428/143; 65/31; 65/61

(58) Field of Classification Search .................. 428/149
See application file for complete search history.

(56) References Cited

U.S. PATENT DOCUMENTS

2005/0013972 A1   1/2005   Kusabiraki et al. .......... 428/141

*Primary Examiner* — David Sample
*Assistant Examiner* — Laura Auer
(74) *Attorney, Agent, or Firm* — Robert P. Santandrea (57) ABSTRACT

A glass article having an edge of which at least a portion that is ground and subsequently etched to provide a roughened edge. The roughened edge scatters light, thus enabling the glass article to be properly aligned. In some embodiments, the roughened edge also provides a surface having a coefficient of friction that facilitates handling of the glass article. The edge may further include at least one chamfer that may either be polished, so as to be transparent or ground and subsequently etched.

56 Claims, 7 Drawing Sheets

GLASS ARTICLE HAVING IMPROVED EDGE

BACKGROUND OF INVENTION

The invention relates to glass articles having a roughened surface. More particularly, the invention relates to glass articles having a roughened peripheral surface or edge that is capable of scattering incident light. Even more particularly, the invention relates to a glass article having an edge that has been roughened by etching the edge.

Glass articles, such as liquid crystal display image masks, require relatively smooth, polished planar surfaces that are free of physical defects or contamination. A rogue contaminant particle, if pulled across the polished planar surface may, for example, mechanically abrade the surface, producing a physical dig or subsurface damage. Particle contamination may be generated by the release of trapped debris (e.g., glass chips, lapping and/or polishing compounds) originating from the ground edge of the glass article during handling or from ultrasonic cleaning. The released debris may work itself onto the polished surface of the article. Another source of contamination is crack propagation originating from subsurface damage. Such crack propagation releases glass chips from the ground edge.

Glass articles such as image masks are often provided with ground or otherwise roughened edges. Because of their light scattering properties, such roughened edges assist in alignment of the glass article. In addition, roughened edges facilitate manual handling of the glass article. However, ground edges also act as a major source of debris that may damage the polished surfaces of the article. Thus, while providing a glass article with roughened edges is highly desirable, it also is a major source of contamination. While polishing the edge drastically reduces the amount of debris, the resulting surface does not satisfactorily scatter light or facilitate handling of the article.

Therefore, what is needed is a glass article having an edge that is capable of scattering light and/or facilitating handling, wherein the edge has a low level of release of debris. What is also needed is a method of making such an edge.

SUMMARY OF INVENTION

The present invention meets these and other needs by providing a glass article having at least one edge (also referred to hereinafter as a "peripheral surface") having at least a portion that is ground and subsequently etched to provide a roughened edge. The roughened edge scatters light, thus enabling the glass article to be properly aligned. In some embodiments, the roughened edge also provides a surface having a coefficient of friction that facilitates handling of the glass article. The peripheral surface may further include at least one chamfer. The chamfer may be polished, so as to be transparent, or etched to provide a roughened surface.

Accordingly, one aspect of the invention is to provide a glass article. The glass article has a peripheral surface comprising a roughened portion that has been ground and etched. The roughened portion has a root mean square roughness (also referred to herein as "RMS roughness") that is capable of scattering light of a predetermined wavelength. The peripheral surface having the roughened portion has a particle release of less than about 740 particles/cm$^2$ area of the peripheral surface, wherein each of the particles released is greater than 2 µm in size please provide particle release rate.

A second aspect of the invention is to provide a fused silica article. The fused silica article has a peripheral surface having an etched portion that has a RMS roughness that is capable of scattering light of a predetermined wavelength. The roughened portion is formed by: providing a near net shape of the fused silica article; grinding the near net shape including the peripheral surface to a dimensional tolerance; and etching at least a portion of the ground peripheral surface to form the etched portion of the peripheral surface. The peripheral surface having the roughened portion has a particle release of less than about 740 particles/cm$^2$ area of the peripheral surface, wherein each of the particles released is greater than 2 µm in size.

A third aspect of the invention is to provide a fused silica article having a peripheral surface. The peripheral surface comprises: a roughened portion that has a RMS roughness that is capable of scattering light of a predetermined wavelength, wherein the roughened portion has been formed by: providing a near net shape of the fused silica article, the near net shape having two major planar surfaces and a peripheral surface; grinding the near net shape including the peripheral surface to a dimensional tolerance, and wherein at least one chamfer adjacent to and intersecting a major planar surface of the near net shape is formed; and etching at least a portion of the peripheral surface to form the roughened portion of the peripheral surface. The peripheral surface having the roughened portion has a particle release of less than about 740 particles/cm$^2$ area of the peripheral surface, wherein each of the particles released is greater than 2 µm in size.

A fourth aspect of the invention is to provide a method of making a glass article having a roughened peripheral surface. The method comprises the steps of: providing a near net shape of the fused silica article, the near net shape having two major planar surfaces and a peripheral surface; grinding the near net shape including the peripheral surface to a dimensional tolerance; and etching at least a portion of the ground peripheral surface to form the roughened surface, wherein the roughened surface has a RMS roughness that is capable of scattering light of a predetermined wavelength to form the glass article.

A fifth aspect of the invention is to provide a method of roughening a surface of a glass article. The method comprises: providing a glass article having a peripheral surface; grinding at least a portion of the peripheral surface to produce a ground portion of the peripheral surface; and etching the ground portion of the surface to form an etched surface. The roughened surface has a RMS roughness or opacity that is capable of scattering light of a predetermined wavelength.

These and other aspects, advantages, and salient features of the present invention will become apparent from the following detailed description, the accompanying drawings, and the appended claims.

BRIEF DESCRIPTION OF THE DRAWINGS

FIG. 2a is a schematic representation of a cross-section of a ground peripheral surface;

FIG. 2b is a schematic representation of a cross-section of a peripheral surface that has been ground using at least one of a lower grit and less aggressive process conditions than those used to produce the peripheral surface shown FIG. 2a;

FIG. 2c is a schematic representation of a cross-section of a peripheral surface that has been ground and etched;

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as either comprising at least one of a group of elements and combinations thereof, it is understood that the group may comprise any number of those elements recited, either individually or in combination with each other. Similarly, whenever a group is described as consisting of at least one of a group of elements and combinations thereof, it is understood that the group may consist of any number of those elements recited, either individually or in combination with each other.

Figure 1:
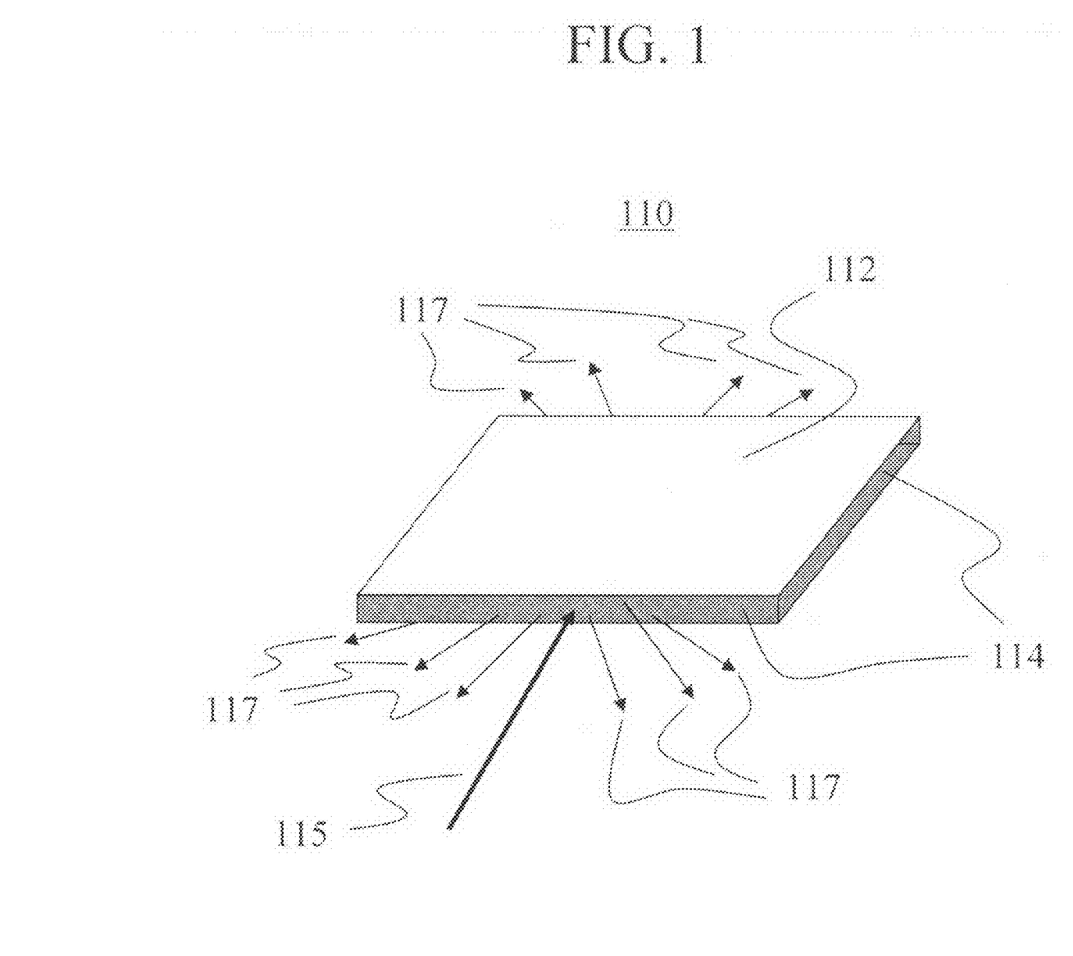
FIG. 1 is a schematic representation of a planar glass article.

Referring to the drawings in general and to FIG. 1 in particular, it will be understood that the illustrations are for the purpose of describing a particular embodiment of the invention and are not intended to limit the invention thereto.

A glass article having a peripheral surface—also referred to as herein as an "edge"—comprising a roughened portion is provided. The terms "peripheral surface" and "edge" are used interchangeably herein and are understood to be equivalent terms. The roughened portion may include the entire peripheral surface or an area that is less than the entire area of the peripheral surface. The roughened portion is formed by first grinding at least a portion of the peripheral surface, followed by etching the ground portion. In one embodiment, the etched portion has a RMS roughness of at least about 200 nm. In another embodiment, the etched portion has RMS roughness is at least about 300 nm. The resulting roughened portion has a RMS roughness that is capable of scattering light of a predetermined wavelength. The glass article also exhibits a particle release of less than about 740 particles/cm$^2$ area of the peripheral surface. As used herein, the term "particle release" means the total number of particles having a size greater than 2 μm released per unit area of the surface (also referred to herein as the "edge" of the glass article) into deionized water after agitation at 120 kHz with 370-400 W power for 4 minutes at room temperature. In some embodiments, the surface from which particle release is measured is the peripheral surface (also referred to herein as the "edge" of the glass article) of the glass article.

Turning to FIG. 1, a planar glass article 110 is shown. The planar glass article 110, which is representative of a fused silica LCD image mask (also referred to herein as a "LCDIM"), has two major planar surfaces 112 and four peripheral surfaces 114. The glass article, however, need not be a LCDIM, but may instead be, for example, a cylindrical glass article (not shown), such as an optical element in a lithographic stepper/scanner system. Such a cylinder has two major faces and a single peripheral surface. For the purposes of describing the invention, planar glass article 110 will be described and referred to, unless otherwise stated.

Fused silica articles, such as LCDIMs and the like, are typically manufactured by first cutting a near net shape of the glass article from a glass boule. The edge—or peripheral surface—of the glass article is the ground to within the dimensional tolerances of the article. As used herein, grinding a glass article to within "dimensional tolerance" refers to finishing the glass article to a dimension that is within a predetermined tolerance of a prescribed dimension of the article. In the present invention, the peripheral surface ground is ground to its final size and then etched. The major planar surfaces are then flattened by additional grinding and lapping, and the flattened surfaces are subsequently polished and cleaned.

Optical elements, such as lenses and LCDIMs, must be aligned precisely within an apparatus, such as a lithographic scanner/stepper system. Alignment is typically accomplished by irradiating a roughened peripheral surface or edge 114 of the glass article 110 with a laser beam 115 having a selected or predetermined wavelength and using light scattered 117 from the laser beam 115 back from or through peripheral surface 114 to align the glass article 110. The predetermined wavelength is typically in a range from about 500 nm up to about 670 nm. In one embodiment, the predetermined wavelength is about 532 nm, whereas in another embodiment, the predetermined wavelength is about 633 nm. To facilitate detection of the scattered light (and alignment of the optical element), it is particularly advantageous that at least a portion of peripheral surfaces 114 have some degree of roughness or opacity to detect the scattered light.

Figure 2:
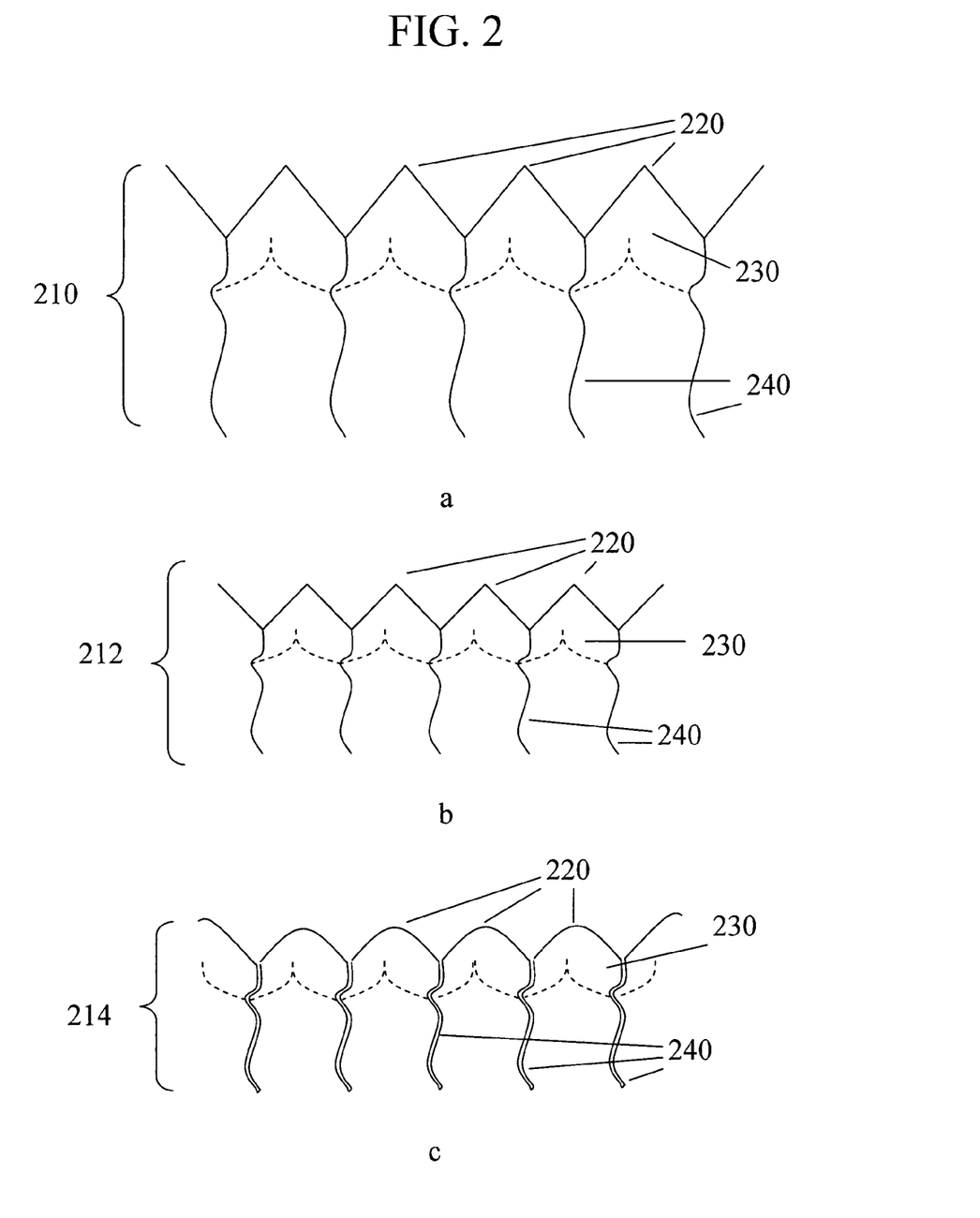

To date, such roughening of peripheral surfaces 114 has been typically achieved by grinding the peripheral surfaces 114. Grinding particles, glass chips, and other contaminants released by the grinding process tend to migrate to planar faces 112 of glass article 110, causing scratches thereon. Debris generated by grinding also leads to crack propagation during subsequent processing and handling of glass article 110. A cross-section of a ground edge or peripheral surface is schematically shown in FIG. 2a. The ground edge 210 has a roughness 220, a compaction zone 230, and subsurface damage 240. Compaction zone 230 is a subsurface region in which the glass is compressed as a result of the pressure exerted on the edge during grinding and/or polishing, whereas subsurface damage 240 includes cracks, embedded particulate matter, glass chips, and the like that are generated by the grinding process. The magnitude of these effects is dependent upon the grit size and grinding conditions that are used to generate the peripheral surface. A cross-section of a peripheral surface 212 that has been ground using at least one of a lower grit and less aggressive process conditions than those used to produce the ground edge 210 shown FIG. 2a is schematically shown in FIG. 2b. Relative to the ground edge 210 shown in FIG. 2a, the edge 212 shown in FIG. 2b has a lesser degree of roughness 220, a smaller compaction zone 230, and subsurface damage 240 that does not extend as deeply into the bulk of the glass article.

Etching dissolves or releases loose particles generated during edge grinding. Etching also releases embedded debris and rounds subsurface damage. A schematic representation of a microscopic cross-section of an etched portion of the peripheral surface is schematically shown in FIG. 2c. Relative to the peripheral surfaces shown in FIGS. 2a and 2b, the etching process has rounded the roughened surface 212, providing a frosted optical appearance. In addition, crack tips 216 have been rounded. As a result of such rounding by the etching process, crack tip propagation is minimized.

In the present invention, at least a portion of the peripheral surfaces 114 is roughened by first grinding and/or lapping the peripheral surface. The peripheral surface is then etched using either an acid or alkali etchant to produce an opaque or frosted surface. The resulting opaqueness or roughness is capable of scattering light of the predetermined wavelength at a predetermined scattering angle to incident light. The predetermined wavelength may be in a range from about 500 nm up to about 670 mm, and the scattering angle may range from about 5° up to about 60°. In one embodiment, the predetermined wavelength is either about 532 nm or about 633 nm. The scattered light has a normalized intensity ranging from about 120 to about 20 for scattering angles in the above range with absolute total scattering in a range from about 1% up to about 20%.

Figure 3:
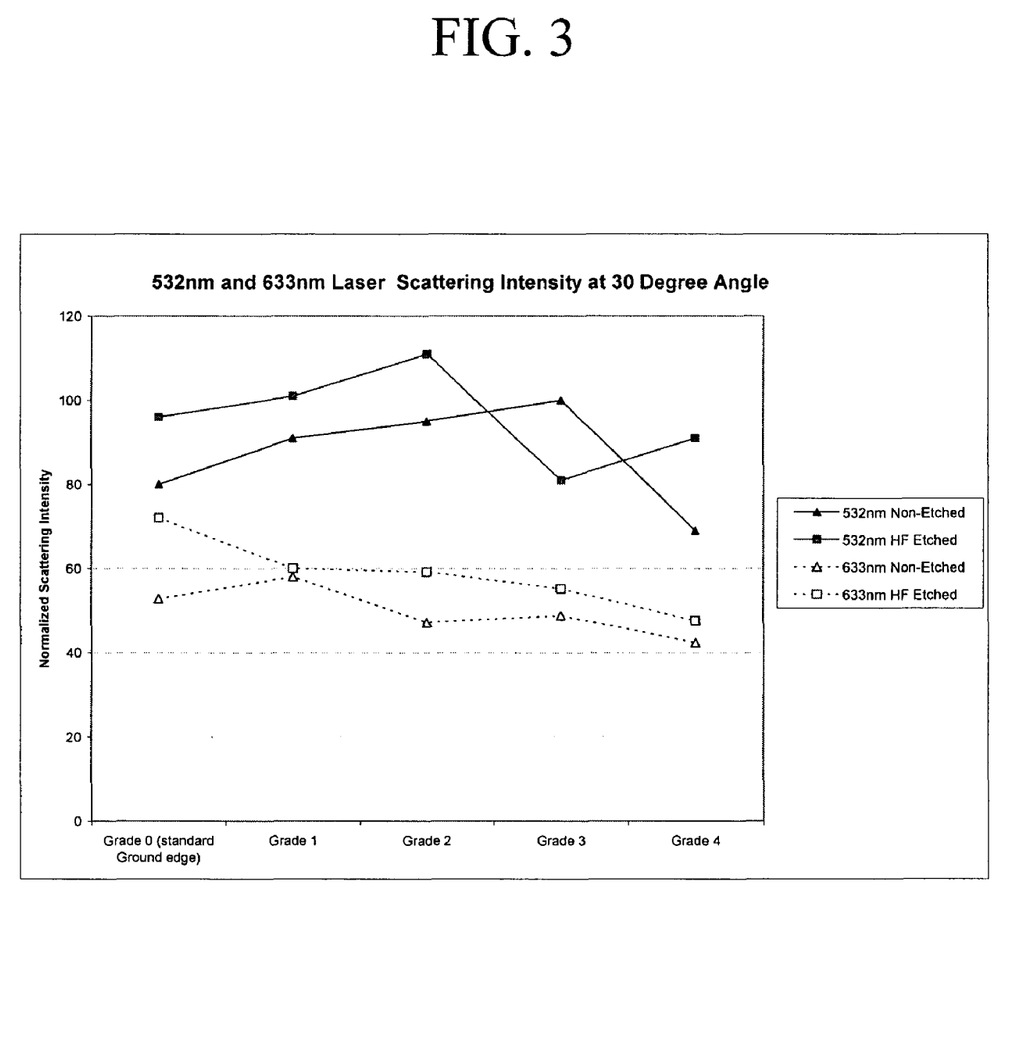
FIG. 3 is a plot of normalized scattering intensity at 30° as a function of grinding grit for fused silica surfaces that had been ground and fused silica surfaces that had been ground and subsequently etched.
Figure 4:
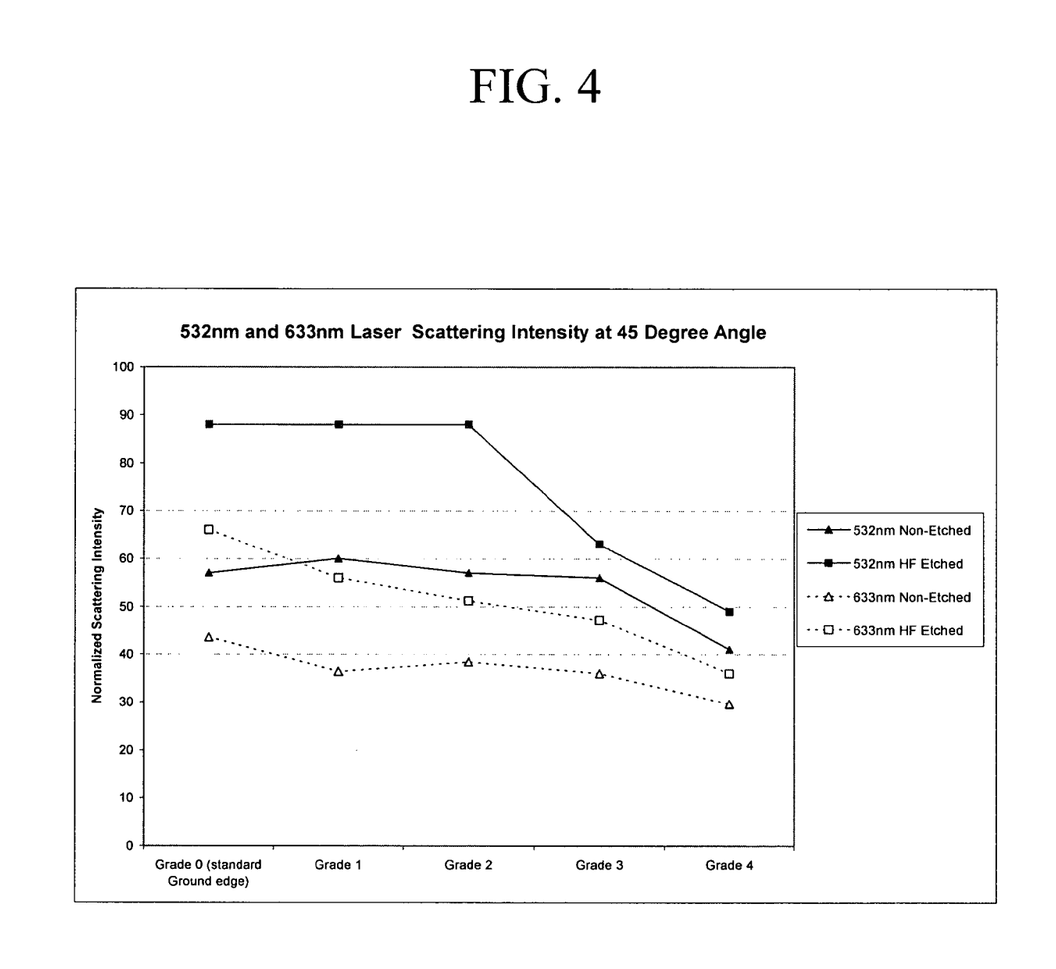
FIG. 4 is a plot of normalized scattering intensity at 45° as a function of grinding grit for fused silica surfaces that had been ground and fused silica surfaces that had been ground and subsequently etched.
Figure 5:
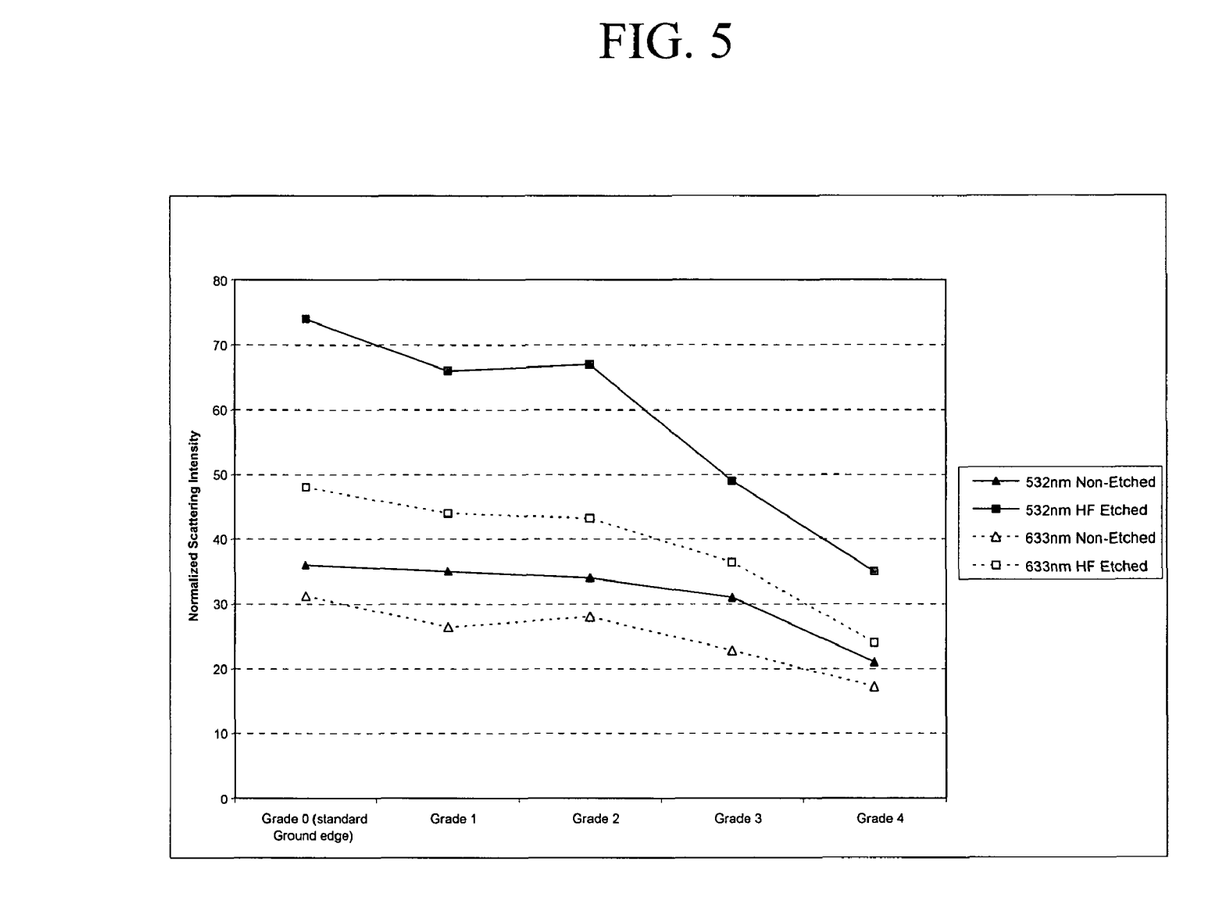
FIG. 5 is a plot of normalized scattering intensity at 60° as a function of grinding grit for fused silica surfaces that had been ground and fused silica surfaces that had been ground and subsequently etched.

Scattering of laser radiation having wavelengths of 532 nm and 633 nm by ground peripheral surfaces and ground peripheral surfaces that were subsequently etched are compared in FIGS. 3, 4, and 5 for scattering angles of 30°, 45°, and 60°, respectively. The peripheral surfaces were ground to varying grades roughness, as determined by interferometry techniques known in the art, such scanning white light or phase shift interferometry. Grades of RMS roughness are listed in Table 1. These ground peripheral surfaces were then etched. At a scattering angle of 30° (FIG. 3), the normalized intensity of 532 nm laser light scattered from the etched edge ranges from about 115 (grade 2 ground) to about 80 (grade 3 ground), whereas the normalized intensity of 633 nm laser light scattered from the etched edge ranges from about 75 (grade 0 ground) to about 45 (grade 4 ground). At a scattering angle of 45° (FIG. 4), the normalized intensity of 532 nm laser light scattered from the etched edge ranges from about 90 (grades 0-2 ground) to about 50 (grade 4 ground), whereas the normalized intensity of 633 nm laser light scattered from the etched edge ranges from about 65 (grade 0 ground) to about 35 (grade 4 ground). At a scattering angle of 60° (FIG. 5), the normalized intensity of 532 nm laser light scattered from the etched edge ranges from about 75 (grade 0 ground) to about 35 (grade 4 ground), whereas the normalized intensity of 633 nm laser light scattered from the etched edge ranges from about 50 (grade 0 ground) to about 25 (grade 4 ground). With the exception of a single point (grade 3 roughness, 30° scattering angle) shown in FIG. 3, ground peripheral edges that had been subsequently etched exhibit a higher level of scattering than ground peripheral edges that were not etched. The light scattering results therefore show that the etched peripheral surface generates the level of scattering necessary for laser alignment of the glass article.

TABLE 1

| Edge Grade | Grinding Grit | RMS roughness (nm) |
| --- | --- | --- |
| 0 | 600 | 581 |
| 1 | Finer than grade 0 | 521 |
| 2 | Finer than grade 1 | 459 |
| 2 | Finer than grade 2 | 236 |
| 4 | Finer than grade 3 | 214 |
| polished | Much finer than grade 4 | 6.4 |

The etched portion of the peripheral surface has a RMS roughness or opacity that is capable of scattering light of a predetermined wavelength. In one embodiment, the etched portion has a RMS roughness of at least about 200 nm. In yet another embodiment, the RMS roughness is at least about 300 nm.

The release of particles from the peripheral surface when subjected to a predetermined frequency of ultrasonic energy, also referred to as "edge particle shedding," serves an indicator of the extent of subsurface damage suffered by the peripheral surface during the roughening process. Particle release is determined by agitating the glass article at 120 kHz at a power of 370 W to 400 W in deionized water for 4 minutes at room temperature. The release of particles larger than 2 μm from the peripheral surface of the glass article is less than about 740 particles/cm² area of the peripheral surface. In one embodiment, release of particles larger than 2 μm from the peripheral surface of the glass article is less than about 446 particles/cm² under these conditions.

Figure 6:
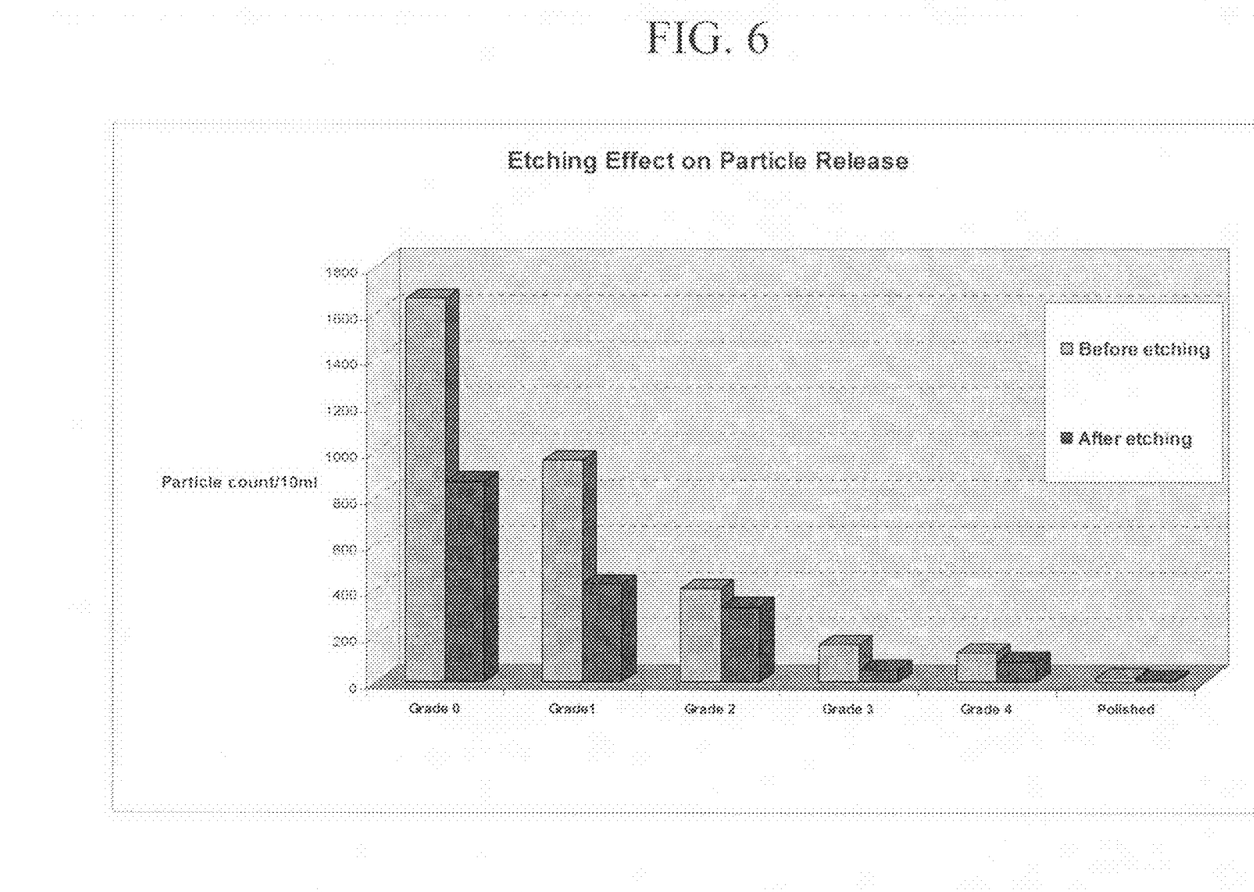
FIG. 6 is a plot of particle release from a fused silica article as a function of degree of surface roughness before and after etching.

The effect of etching on edge particle shedding is shown in FIG. 6, which is a plot of the number of particles released (expressed in particle count/10 ml deionized (DI) water) before and after etching in deionized water during sonic agitation under the conditions previously described herein. To obtain the data shown in FIG. 6, peripheral surfaces were ground to the various grades of listed in Table 1 and then were then etched. Edge particle shedding—i.e., particle release—was measured before and after etching.

The results shown in FIG. 6 reveal that for all grades of roughness, the peripheral surfaces that had been etched exhibit reduced levels of particle release. In particular, the levels of release from Grade 1 and Grade 2 surfaces after etching were about half of those levels observed before laser roughening.

In some instances, optical elements—particularly LCDIMs—are handled manually. Accordingly, it should, in one embodiment, be possible to frictionally grip the optical element on at least one peripheral surface or a portion thereof. Thus, in one embodiment, at least a portion the peripheral surface 114 has a static coefficient of friction in a range from about 0.80 to about 0.50 as measured using a Teflon™ rod in dry conditions. The static coefficient of friction is determined as follows. Friction testing of edges is conducted in a cylinder-on-flat geometry using Teflon rods (5.9 mm diameter). The Teflon rods extend across the entire edge flat and beyond. A new Teflon rod is used for each test. Testing is performed using a commercial test machine that permits control and monitoring of normal and lateral loads as well as the translation velocity. The cylinders are loaded transversely onto the sample edge with the desired normal load. This normal load is maintained constant throughout the test. Sample translation is performed in a reciprocating manner at a velocity of 0.5 mm/s over a distance of 5 to 10 mm. The static coefficient of friction and kinetic (dynamic) coefficient of friction are determined using the guidelines provided in pages 1-11 of ASTM G 115-04, entitled "Standard Guide for Measuring and Reporting Friction Coefficients."

In one embodiment, the fused silica article is a LCDIM, in which case it is particularly advantageous to provide roughened peripheral surfaces or edges for articles having relatively large dimensions. One measure of the dimension of such articles is the "aspect ratio," which is the ratio of a diagonal of a planar surface of the article to the thickness of the article. Aspect ratios for planar articles of varying dimension are listed in Table 2. In one embodiment, a LCDIM having a laser melted peripheral surface as described herein has an aspect ratio of at least 100.

TABLE 2

| Length (mm) | Width (mm) | Diagonal (hypotenuse) (mm) | Thickness (mm) | Aspect ratio (mm, thick vs. diagonal) |
|---|---|---|---|---|
| 1220.0 | 1400.0 | 1857.0 | 13.0 | 142.8 |
| 800.0 | 920.0 | 1219.2 | 8.0 | 152.4 |
| 800.0 | 920.0 | 1219.2 | 10.0 | 121.9 |
| 800.0 | 960.0 | 1249.6 | 8.0 | 156.2 |
| 800.0 | 960.0 | 1249.6 | 10.0 | 125.0 |

Figure 7:
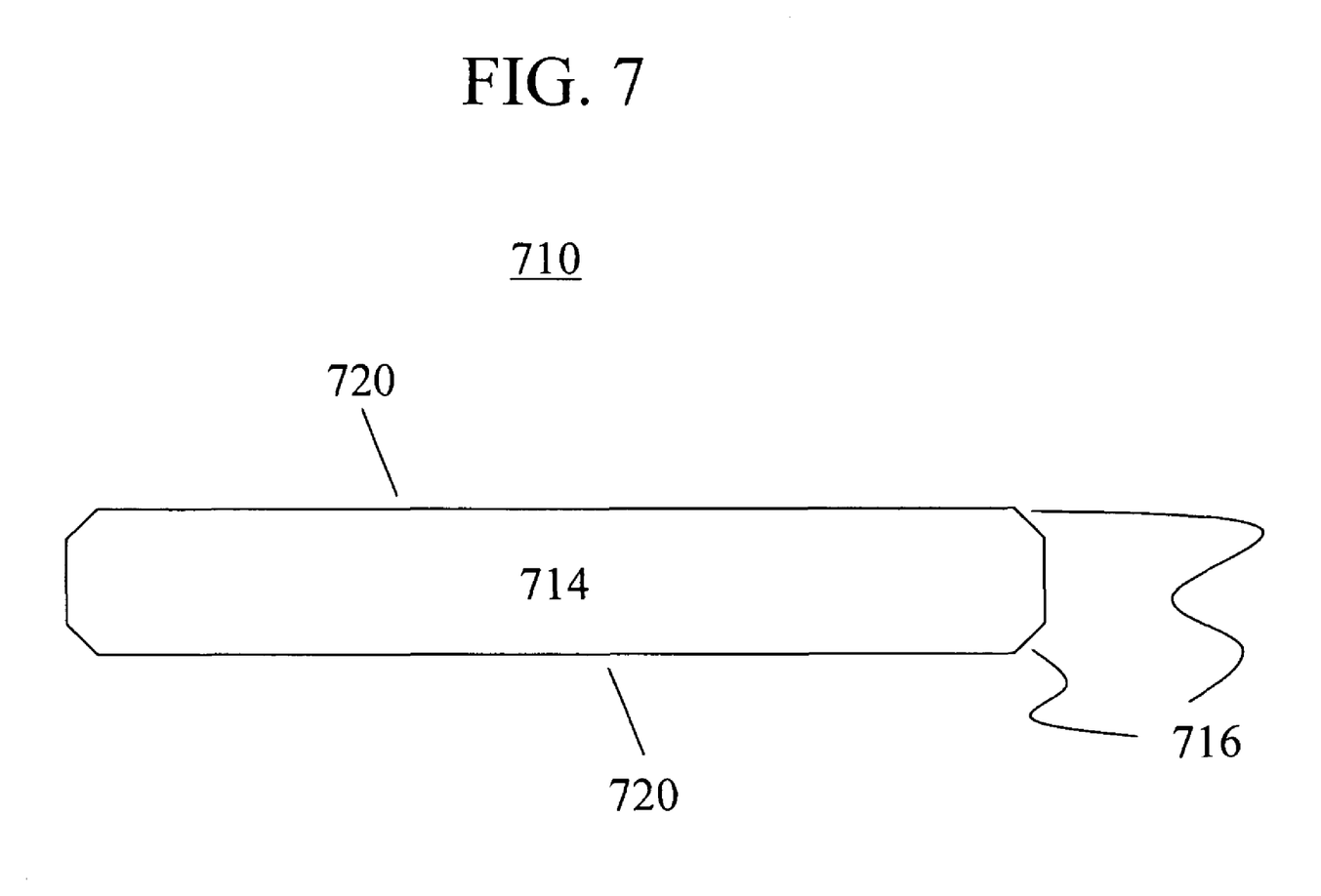
FIG. 7 is a schematic representation of a side view of a glass article having a peripheral surface comprising two chamfers.

In one embodiment, the peripheral surface further includes at least one chamfer adjacent to and intersecting a major planar surface (720 in FIG. 7) of the glass article. The chamfer is typically formed during grinding of the near net shape. A profile of a peripheral surface 714 having two chamfers 716 is schematically shown in FIG. 7. In one embodiment, at least a portion of chamfer 716 is polished, producing a transparent chamfer. In another embodiment, at least a portion of chamfer 716 has a RMS roughness that is capable of scattering light of a predetermined wavelength. The predetermined wavelength may be in a range from about 500 nm up to about 670 nm. The predetermined wavelength may, in one embodiment, be one of 532 nm and 633 nm. The RMS roughness may be produced during grinding of the near net shape to within the dimensional tolerances of the glass article by first grinding chamfer 716, followed by etching to produce an opaque surface. The portion of the chamfer that is ground and etched may have a RMS roughness of at least about 200 nm. Chamfer 716 is relatively free of damage and generates an interface with planar faces 720 that is free of checks and chips greater than 5 μm in size.

A method of making a glass article having a roughened surface is also provided. A near net shape of the glass article having two major planar surfaces and a peripheral surface or edge is first provided. As previously described, the near net shape may be cut from a glass or fused silica boule. The near net shape is then ground to within a dimensional tolerance of the glass article. During the grinding step, at least a portion of the peripheral surface is ground.

The ground portion of the peripheral surface is then etched to form an etched surface having a RMS roughness or opacity that is capable of scattering light of a predetermined wavelength. Furthermore, the etching step may also provide the peripheral surface with an increased coefficient of friction, thus facilitating handling of the glass article.

The etching step may be one in which either a wet acid or alkali etchant is used to etch the ground portion. In one embodiment, the etchant is an acid solution comprising and acid such as, for example, HF or HF combined with a fluoride salt such as NaF, KF, or the like. In addition, other acids such as $H_2SO_4$, HCl, $H_3PO_4$, $HNO_3$, or the like may be added to the HF solution to enhance etch rate and solubility of etching by-products.

In another embodiment, the ground portion of the peripheral surface may be etched using an alkali liquid solution. Such alkali solutions include, but are not limited to, KOH, $NH_4OH$, $NH_4HF_2$, TMAH (tetra methyl ammonium hydroxide), and the like. The alkali etchant should be heated up to a temperature in a range from about 80° C. up to about 100° C. to enhance the etch rate.

After etching, the major planar surfaces of the glass article are typically flattened by grinding and/or lapping and then polished and cleaned.

The method may further include forming at least one chamfer on the peripheral surface adjacent to and intersecting a major planar face of the glass article. The chamfer may be formed during the grinding step using grinding operations such as, but not limited to, wheel grinding. The chamfer may be polished to mitigate subsurface damage and glass chip generation. Alternatively, the ground surface of the chamfer may be etched to provide a surface that is capable of scattering light of a predetermined wavelength, has a desired coefficient of friction, or both.

Similarly, a method of roughening a surface of a glass article is also provided. A glass article having a peripheral surface is first provided. At least a least a portion of the peripheral surface is then ground to produce a ground portion having a RMS roughness of at least 200 nm. The ground portion is then etched to form an etched surface having a RMS roughness that is capable of scattering light of a predetermined wavelength.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A glass article, the glass article having a peripheral surface, the peripheral surface comprising a roughened portion that has been ground and etched, wherein the roughened portion has a RMS roughness that is capable of scattering light of a predetermined wavelength, and wherein the peripheral surface having the roughened portion has a particle release of less than about 740 particles/cm² area of the peripheral surface, wherein each of the particles released is greater than 2 μm in size, and wherein the light scattered by the roughened portion, when measured at an angle in a range from about 5° to about 60° to incident light, has a normalized intensity in a range from about 120 to 20 with absolute total scattering in a range from about 1% up to about 20%.

2. The glass article according to claim 1, wherein the peripheral surface further comprises at least one chamfer adjacent to and intersecting a major planar surface of the glass article.

3. The glass article according to claim 2, wherein at least a portion of the chamfer has been polished.

4. The glass article according to claim 2, wherein the chamfer has a roughness that is capable of scattering light of a predetermined wavelength.

5. The glass article according to claim 4, wherein the chamfer includes an etched portion.

6. The glass article according to claim 5, wherein the etched portion of the chamfer has a RMS roughness of at least about 200 nm.

7. The glass article according to claim 1, wherein the peripheral surface has a static coefficient of friction in a range from about 0.80 to about 0.50, as measured using a Teflon rod in dry conditions.

8. The glass article according to claim 1, wherein the glass article is a fused silica article.

9. The glass article according to claim 8, wherein the fused silica article is a liquid crystal display image mask.

10. The glass article according to claim 8, wherein the fused silica article has an aspect ratio of at least 100.

11. The glass article according to claim 1, wherein the RMS roughness is at least about 200 nm.

12. The glass article according to claim 11, wherein the RMS roughness is at least about 300 nm.

13. The glass article according to claim 1, wherein the predetermined wavelength is in a range from about 500 nm to about 670 nm.

14. The glass article according to claim 1, wherein the peripheral surface has a static coefficient of friction in a range from about 0.80 to about 0.50, as measured using a Teflon rod in dry conditions.

15. A fused silica article, the fused silica article having a peripheral surface having an etched portion that has a RMS roughness that is capable of scattering light of a predetermined wavelength, wherein the roughened portion has been formed by:
   a. providing a near net shape of the fused silica article;
   b. grinding the near net shape including the peripheral surface to a dimensional tolerance of the fused silica article; and
   c. etching at least a portion of the peripheral surface to form an etched portion of the peripheral surface, wherein the peripheral surface having the etched portion has a particle release of less than about 740 particles/$cm^2$ area of the peripheral surface, wherein each of the particles released is greater than 2 μm in size, and wherein the light scattered by the roughened portion, when measured at an angle in a range from about 5° to about 60° to incident light, has a normalized intensity in a range from about 120 to 20 with absolute total scattering in a range from about 1% up to about 20%.

16. The fused silica article according to claim 15, wherein the peripheral surface has a static coefficient of friction in a range from about 0.80 to about 0.50, as measured using a Teflon rod in dry conditions.

17. The fused silica article according to claim 15, wherein the fused silica article is a liquid crystal display image mask.

18. The fused silica article according to claim 15, wherein the fused silica article has an aspect ratio of at least 100.

19. The fused silica article according to claim 15, wherein etching the polished surface comprises etching the ground surface with one of an acid etchant and an alkali etchant.

20. The fused silica article according to claim 19, wherein the alkali etchant comprises at least one of KOH, $NH_4OH$, $NH_4HF_2$, and TMAH.

21. The fused silica article according to claim 19, wherein the acid etchant comprises HF and at least one of a fluoride salt and an acid selected from the group consisting of $H_2SO_4$, HCl, $H_3PO_4$, and $HNO_3$.

22. The fused silica article according to claim 15, wherein the RMS roughness is at least about 200 nm.

23. The fused silica article according to claim 22, wherein the RMS roughness is at least about 300 nm.

24. The fused silica article according to claim 15, wherein the predetermined wavelength is in a range from about 500 nm to about 670 nm.

25. The fused silica article according to claim 15, wherein the peripheral surface has a static coefficient of friction in a range from about 0.80 to about 0.50, as measured using a Teflon rod in dry conditions.

26. A fused silica article, the fused silica article having a peripheral surface, the peripheral surface comprising:
   a. a roughened portion that has a roughness that is capable of scattering light of a predetermined wavelength, wherein the roughened portion has been formed by:
     i. providing a near net shape of the fused silica article the near net shape having two planar surfaces and a peripheral surface;
     ii. grinding the near net shape including the peripheral surface to a dimensional tolerance, and wherein at least one chamfer adjacent to and intersecting a major planar surface of the near net shape is formed by grinding the near net shape; and
     iii. etching at least a portion of the peripheral surface to form an etched portion of the peripheral surface, wherein the peripheral surface having the etched portion has a particle release of less than about 740 particles/$cm^2$ area of the peripheral surface, wherein each of the particles released is greater than 2 μm in size, and wherein the light scattered by the roughened portion, when measured at an angle in a range from about 5° to about 60° to incident light, has a normalized intensity in a range from about 120 to 20 with absolute total scattering in a range from about 1% up to about 20%.

27. The fused silica article according to claim 26, wherein at least a portion of the chamfer has been polished.

28. The fused silica article according to claim 26, wherein the chamfer has a roughness that is capable of scattering light of a predetermined wavelength.

29. The fused silica article according to claim 26, wherein at least a portion of the chamfer has been etched.

30. The fused silica article according to claim 28, wherein the portion of the chamfer that has been etched has a RMS roughness of at least about 200 nm.

31. The fused silica article according to claim 30, wherein the etched portion of the peripheral surface has a RMS roughness of at least about 200 nm.

32. The fused silica article according to claim 31, wherein the roughened portion has a roughness of at least about 300 nm.

33. The fused silica article according to claim 26, wherein the predetermined wavelength is in a range from about 500 nm to about 670 nm.

34. The fused silica article according to claim 26, wherein the fused silica article is a liquid crystal display image mask.

35. The fused silica article according to claim 26, wherein the fused silica article has an aspect ratio of at least 100.

36. The fused silica article according to claim 26, wherein the peripheral surface has a static coefficient of friction in a range from about 0.80 to about 0.50, as measured using a Teflon rod in dry conditions.

37. The fused silica article according to claim 26, wherein etching the ground surface comprises etching the ground surface with one of an acid etchant and an alkali etchant.

38. The fused silica article according to claim 37, wherein the alkali etchant comprises at least one of KOH, $NH_4OH$, $NH_4HF_2$, and TMAH.

39. The fused silica article according to claim 37, wherein the acid etchant comprises HF and at least one of a fluoride salt and an acid selected from the group consisting of $H_2SO_4$, HCl, $H_3PO_4$, and $HNO_3$.

40. A method of making a glass article having a roughened peripheral surface, the method comprising the steps of:
   a. providing a near net shape of the fused silica article, the near net shape having two major planar surfaces and a peripheral surface;
   b. grinding the near net shape including the peripheral surface to a dimensional tolerance; and
   c. etching at least a portion of the ground peripheral surface to form a etched surface, wherein the etched surface has a roughness that is capable of scattering light of a predetermined wavelength to form the glass article, wherein the light scattered by the roughened portion, when measured at an angle in a range from about 5° to about 60° to incident light, has a normalized intensity in a range from about 120 to 20 with absolute total scattering in a range from about 1% up to about 20%.

41. The method according to claim 40, wherein the step of etching at least a portion of the ground peripheral surface to form a etched surface comprises etching the surface with one of an acid etchant and an alkali etchant.

42. The method according to claim 41, wherein the alkali etchant comprises at least one of KOH, $NH_4OH$, $NH_4HF_2$, and TMAH.

43. The method according to claim 42, wherein the step of etching at least a portion of the ground peripheral surface to form a etched surface comprises heating the alkali etchant to a temperature in a range from about 80° C. up to about 100° C.

44. The method according to claim 41, wherein the acid etchant comprises HF and at least one of a fluoride salt and an acid selected from the group consisting of $H_2SO_4$, HCl, $H_3PO_4$, and $HNO_3$.

45. The method according to claim 40, wherein the glass article is a fused silica article.

46. The method according to claim 40, wherein the fused silica article is a liquid crystal display image mask.

47. The method according to claim 40, wherein the predetermined wavelength is in a range from about 500 nm to about 670 nm.

48. The method according to claim 40, wherein the etched surface has a RMS roughness of at least about 200 nm.

49. The method according to claim 40, wherein the step of grinding the near net shape further comprises forming at least one chamfer on the peripheral surface, wherein the chamfer is adjacent to and intersects one of the two major planar faces of the glass article.

50. The method according to claim 49, further comprising the step of polishing at least a portion of the chamfer to form a polished chamfer.

51. The method according to claim 49, further comprising the step of etching the chamfer to form a chamfer having a roughened surface.

52. The method according to claim 40, further including the step of polishing the two major planar faces.

53. The method according to claim 40, wherein the glass article is a fused silica article.

54. The method according to claim 40, wherein the fused silica article is a liquid crystal display image mask.

55. The method according to claim 40, wherein the peripheral surface has a static coefficient of friction in a range from about 0.80 to about 0.50, as measured using a Teflon rod in dry conditions.

56. The method according to claim 40, wherein the peripheral surface having the etched surface has a particle release of less than about 740 particles/$cm^2$ area of the peripheral surface, wherein each of the particles released is greater than 2 μm in size.

* * * * *